United States Patent
Lior et al.

(10) Patent No.: US 12,088,562 B1
(45) Date of Patent: Sep. 10, 2024

(54) TUNNELING OF MACsec FRAMES

(71) Applicant: Marvell Israel (M.I.S.L) Ltd., Yokneam (IL)

(72) Inventors: Ayal Lior, Modiin (IL); Joergen P. R. Hofman-Bang, Ballerup (DK); Itay Shlomo Peled, Hagor (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 235 days.

(21) Appl. No.: 17/860,414

(22) Filed: Jul. 8, 2022

Related U.S. Application Data (60) Provisional application No. 63/219,741, filed on Jul. 8, 2021.

(51) Int. Cl.
*H04L 9/40* (2022.01)
*H04L 12/46* (2006.01)
*H04L 9/32* (2006.01)
*H04W 12/06* (2021.01)

(52) U.S. Cl.
CPC ........ *H04L 63/029* (2013.01); *H04L 12/4633* (2013.01); *H04L 63/0428* (2013.01); *H04L 9/3242* (2013.01); *H04L 63/0485* (2013.01); *H04W 12/06* (2013.01)

(58) Field of Classification Search
CPC .............. H04L 63/029; H04L 63/0428; H04L 63/0485; H04L 12/4633; H04L 9/32; H04L 9/3242; H04W 12/106
See application file for complete search history.

(56) References Cited

U.S. PATENT DOCUMENTS

| | | | | |
|---|---|---|---|---|
| 7,742,406 | B1* | 6/2010 | Muppala | H04L 47/10 370/392 |
| 2007/0186100 | A1* | 8/2007 | Wakameda | H04L 69/22 713/160 |
| 2008/0028210 | A1* | 1/2008 | Asano | H04L 63/0485 713/161 |
| 2020/0106719 | A1* | 4/2020 | Acharya | H04L 63/0428 |
| 2020/0186507 | A1* | 6/2020 | Dhanabalan | H04L 63/0272 |
| 2021/0021579 | A1* | 1/2021 | Thorslund | H04L 63/0464 |

OTHER PUBLICATIONS

Elbakoury, "IEEE 802.1AE (MacSec) & IEEE 802.1Qbb (PFC)," Huawei Technologies Co., available at http://www.ieee1904.org/2/meeting_archive/2015/02/tf2_1502_elbakoury_2.pdf, 2018 (13 pages).

(Continued)

*Primary Examiner* — Shaqueal D Wade-Wright (57) ABSTRACT

A network device is capable of transmitting and/or receiving packets that are encrypted according to a particular network security protocol, while being encapsulated according to any of a variety of tunneling protocols independent of the particular network security protocol. In such embodiments, a customer or network administrator can use the particular network security protocol while having the freedom to choose a particular tunneling protocol that is best suited for a network implementation instead of being limited to a specific tunneling protocol for a particular network security protocol.

22 Claims, 3 Drawing Sheets

(56) References Cited

OTHER PUBLICATIONS

Fedyk, "Frame Format for IEEE 802.1AEdk MACsec Privacy," IEEE Plenary, available at https://www.ieee802.org/1/files/public/docs2019/dk-fedyk-dot1aedk-dataformat-discussion-1105-v01.pdf, Nov. 11, 2019 (13 pages).
Sajassi et al., "Secure EVPN," Internet Engineering Task Force, BESS Working Group, available at https://www.ieee802.org/1/files/public/docs2019/dk-fedyk-dot1aedk-dataformat-discussion-1105-v01.pdf, Oct. 25, 2021 (41 bages).
"Cisco ACI Multi-Site Architecture," Cisco, available at https://www.cisco.com/c/en/us/solutions/collateral/data-center-virtualization/application-centric-infrastructure/white-paper-c11-739609.html, updated Nov. 23, 2021 (140 pages).
"CloudSec Encryption," Cisco, available at https://www.cisco.com/c/en/us/td/docs/dcn/mso/3x/configuration/cisco-aci-multi-site-configuration-guide-301/aci-multi-site-cloudsec.html, updated Apr. 12, 2021 (14 pages).

\* cited by examiner

TUNNELING OF MACsec FRAMES

CROSS REFERENCES TO RELATED APPLICATIONS

This application claims the benefit of U.S. Provisional Patent Application No. 63/219,741, entitled "MACsec Secure Connection Over Any Protocol," filed on Jul. 8, 2021, the disclosure of which is expressly incorporated herein by reference in its entirety for all purposes.

FIELD OF TECHNOLOGY

The present disclosure relates generally to network devices in communication networks, and more particularly to secure transmission of packets in a communication network.

BACKGROUND

To provide secure communications across a network, a network security protocol is typically employed. For instance, the transport layer security (TLS) protocol is an application layer protocol that involves encrypting data transmitted for email applications, instant messaging applications, web browsers, etc. As an illustrative example, an email application at a source device encrypts information in an email and sends the email. Then, an email application at a destination device receives the email and decrypts information in the email.

The Internet Protocol Security (IPsec) protocol involves encrypting contents of an Internet Protocol (IP) packet, which corresponds to Layer-3 in a networking protocol stack. With IPsec, a source device encrypts contents of an IP packet and sends the IP packet via a communication network, which routes the IP packet to a destination device. Upon receiving the IP packet, the destination device decrypts contents of the IP packet.

The IEEE 802.1AE Standard protocol, sometimes referred to as "MACsec," involves encrypting contents of an Ethernet frame, which corresponds to Layer-2 (one level below Layer-3) in the networking protocol stack. With MACsec, a source device encrypts contents of an Ethernet frame and sends the Ethernet frame to a destination device via a communication link. Upon receiving the Ethernet frame, the destination device decrypts contents of the Ethernet frame.

Some network security protocols utilize network tunneling to allow secure communication of encrypted packets via insecure external communication networks. For example, Cisco developed a network security protocol referred to as "CloudSec," which involves encrypting contents of a VxLAN-encapsulated frame. VxLAN is a tunneling protocol in which an Ethernet frame is encapsulated within a User Datagram Protocol (UDP) datagram, which in turn is encapsulated by an outer IP header and an outer Ethernet header. With CloudSec, a tunneling header, which includes the outer Ethernet header, the outer IP header, and a UDP header, has a format specific to CloudSec. For example, the destination port field in the UDP header is set to a specific value that identifies the tunneled packet as being a CloudSec packet.

SUMMARY

In an embodiment, a network device comprises: a plurality of network interfaces configured to couple to a plurality of network links; and a packet processor. The packet processor includes: a classification engine configured to process a header of a packet received via a first network interface among the plurality of network interfaces to determine a classification of the packet that indicates i) data in the packet is to be encrypted and formatted according to a network security protocol, and ii) a tunneling header is to be added to the packet, the tunneling header having a format that is independent of the network security protocol; a header modification engine configured to add the tunneling header to the packet in response to the classification of the packet; a network security protocol engine configured to add to the packet a security header distinct from the tunneling header in response to the classification of the packet; and an encryption engine configured to encrypt only a portion of the packet that is less than the entire packet in response to the classification of the packet. The network device further comprises a transmit processor configured to forward the packet to a second network interface among the plurality of network interfaces so that the second network interface transmits the packet i) that is encrypted and formatted according to the network security protocol, and ii) that includes the tunneling header having the format that is independent of the network security protocol, via a particular network link communicatively coupled to the second network interface.

In another embodiment, a method for securely transmitting packets includes: receiving, at a network device, a packet via a first network interface of the network device; processing, at the network device, a header of the packet to determine a classification of the packet; using, at the network device, the classification of the packet to determine that a tunneling header is to be added to the packet; adding, at the network device, the tunneling header to the packet; using, at the network device, the classification of the packet to determine that data in the packet is to be encrypted and formatted according to a network security protocol, wherein a format of the tunneling header is independent of the network security protocol; adding to the packet, at the network device, a security header distinct from the tunneling header, the security header having a format defined by the network security protocol; encrypting, at the network device, only a portion of the packet that is less than the entire packet; and transmitting the packet from a second network interface of the network device so that the packet, when transmitted, i) is encrypted and formatted according to the network security protocol, and ii) includes the tunneling header having the format that is independent of the network security protocol.

DETAILED DESCRIPTION

Although some current network security protocols enable network tunneling, the type of tunneling is specific to the network security protocol, and thus only one type of tunneling can be used with the network security protocol. For example, CloudSec uses User Datagram Protocol (UDP) tunneling, and the format of the tunnel header is specific to CloudSec. In CloudSec, the destination port field in the UDP header is set to a specific value that identifies the tunneled packet as being a CloudSec packet.

In embodiments described below, a network device is capable of transmitting and/or receiving packets that are encrypted according to a particular network security protocol (e.g., MACsec or another suitable network security protocol), while being encapsulated according to any of a variety of tunneling protocols independent of the particular network security protocol. In such embodiments, a customer or network administrator can use the particular network security protocol while having the freedom to choose a particular tunneling protocol that is best suited for a network implementation instead of being limited to a specific tunneling protocol for a particular network security protocol.

Figure 1:
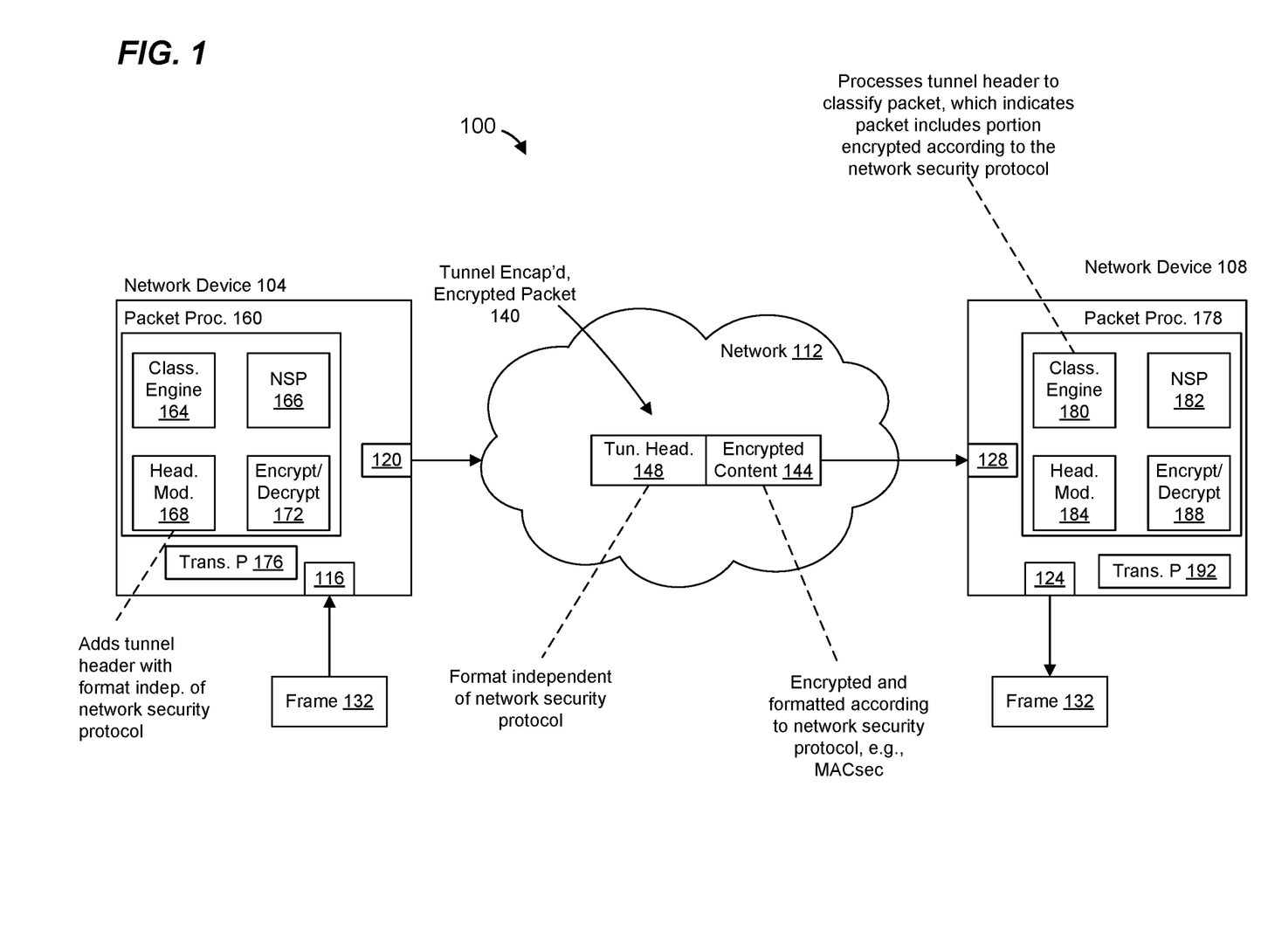
FIG. 1 is a simplified block diagram of an example communication system having network devices that are capable of transmitting and receiving packets that are encrypted according to a particular network security protocol, while being encapsulated according to any of a variety of tunneling protocols independent of the particular network security protocol, according to an embodiment.

FIG. 1 is a simplified block diagram of an example communication system 100, according to an embodiment. The communication system 100 includes a network device 104 communicatively coupled to a network device 108 via a communication network 112. In some embodiments, the network device 104 is a switch, a router, a bridge, etc., and/or the network device 108 is a switch, a router, a bridge, etc. In an embodiment, the network device 104 is a first edge device of a first customer network (not shown); the network device 108 is a second edge device of a second customer network (not shown); and the communication network 112 includes a service provider network.

In some embodiments, the communication network 112 includes multiple different communication networks, each using a different tunneling protocol stack. In some such embodiments, at an edge between different communication networks, one tunnel is terminated and a corresponding tunneling header is removed; then a new tunnel is started and a different tunneling header is added. In some embodiments, different communication networks use different tunneling protocols, whereas in other embodiments at least some of the different communication networks use a same tunneling protocol. Illustrative examples of tunneling protocols used in the communication network 112 include Layer 2 Multi-protocol Label Switching (MPLS) tunneling, Layer 3 MPLS tunneling, Internet Protocol version 6 (IPv6) tunneling over hierarchical MPLS network (with or without virtual local area network (VLAN) tags), segment routing IPv6 (SRv6) over hierarchical MPLS network, Ethernet over SRv6 tunneling using universal datagram protocol (UDP) for multiplexing, Generic Routing Encapsulation (GRE) tunneling, VxLAN tunneling, a proprietary tunneling protocol, etc.

In another embodiment, the communication network 112 includes a service provider network; the network device 104 is a first edge device of the service provider network that is communicatively coupled to a first customer network (not shown); and the network device 108 is a second edge device of the service provider network that is communicatively coupled to a second customer network (not shown).

The network device 104 includes a plurality of network interfaces (e.g., ports, trunks, etc.), including a network interface 116 and a network interface 120. The network device 104 is communicatively coupled to the communication network 112 via the network interface 120.

The network device 108 includes a plurality of network interfaces (e.g., ports, trunks, etc.), including a network interface 124 and a network interface 128. The network device 108 is communicatively coupled to the communication network 112 via the network interface 128.

The network device 104 receives a frame (sometimes referred to herein as a "packet") 132 via the network interface 116. In some embodiments, the frame 132 includes an Ethernet frame. In some embodiments, the frame 132 is received as an encrypted frame that is encrypted and formatted according to a network security protocol (e.g., MACsec or another suitable network security protocol). In such embodiments, the network device 104 is configured to decrypt and reformat the encrypted frame to recover the frame 132.

The network device analyzes a header of the frame 132 to determines that i) data in the frame 132 are to be encrypted and formatted according to a network security protocol (e.g., MACsec or another suitable network security protocol), and ii) a tunneling header is to be added to the frame 132 to generate a tunnel encapsulated, encrypted packet 140. Based on the analyzation of the header of the frame 132, the network device 104 further determines that the tunnel encapsulated, encrypted packet 140 is to be transmitted from the network device 104 via the network interface 120.

The network device 104 generates the tunnel encapsulated, encrypted packet 140 to include data from the frame 132 that are encrypted and formatted according to a network security protocol such as MACsec or another suitable network security protocol. For example, the tunnel encapsulated, encrypted packet 140 includes encrypted content 144 that corresponds to data from the frame 132 that is encrypted according to a network security protocol. The network device 104 generates the tunnel encapsulated, encrypted packet 140 to further include a tunneling header 148 that corresponds to a suitable tunneling protocol and has a format that is independent of the network security protocol.

The tunnel encapsulated, encrypted packet 140 is forwarded through the communication network 112 to the network interface 128 of the network device 108. For example, network devices (not shown) in the communication network 112 use information in the tunneling header 148 to route the tunnel encapsulated, encrypted packet 140 through the communication network 112. Network devices within the communication network 112 may alter one or more fields within the tunneling header 148 while the packet 140 is forwarded through the communication network 112 without impacting the encrypted user data 236 and the network security protocol. In embodiments in which the communication network 112 includes multiple different communication networks using different tunneling protocol stacks, network devices within the communication network 112 may remove the tunneling header 148 and add a new tunneling header while the packet 140 is forwarded through the communication network 112 without impacting the encrypted user data 236 and the network security protocol.

The network device 108 analyzes the tunneling header 148 to determine that the tunnel encapsulated, encrypted packet 140 is to be tunnel-terminated and decrypted by the network device 108. In response, the network device 108 recovers the frame 132 at least by removing the tunneling header 148 and decrypting the encrypted content 144.

Additionally, the network device 108 analyzes header information in the frame 132 to determine that the frame 132 is to be transmitted from the network device 108 via the network interface 124. In response, the network device forwards the frame 132 to the network interface 124 for transmission from the network device 108.

In some embodiments, the network device 108 determines that contents of the frame 132 are to be encrypted and formatted according to a network security protocol prior to transmitting the frame 132 from the network device 108. Thus, the network device 108 generates an encrypted packet at least by encrypting contents of the frame 132 and formatting contents of the frame 132 according to the network security protocol, and then forwards the encrypted packet to the network interface 124 for transmission from the network device 108.

The network device 104 includes a packet processor 160 having several processing engines described below.

For instance, the packet processor 160 includes a classification engine 164 that is configured to process header information in packets received by the network device 104 to classify the packets. In an embodiment, classification of a packet by the classification engine 164 indicates that i) data in the packet are to be encrypted and formatted according to a network security protocol, and ii) a tunneling header is to be added to the packet.

In an embodiment, classification of a packet by the classification engine 164 includes assigning a virtual network interface to the packet, the virtual network interface corresponding to a particular tunnel and a particular network security protocol association. Generally, a virtual network interface is a logical assignment that indicates how the network device 104 is to process and/or forward a packet and, optionally, one or more physical network interfaces via which the packet is to be transmitted from the network device 104. In some instances, a virtual network interface corresponds to a single physical network interface, whereas in other instances a virtual network interface corresponds to multiple physical network interfaces (e.g., a trunk, a set of virtual network interfaces via which a packet is to be multicast, etc.), according to some embodiments.

In some embodiments, the assigned virtual network interface indicates a particular tunnel and a particular network security protocol association. The particular tunnel corresponds to particular contents of the tunneling header 148, and the particular network security protocol association corresponds to i) particular contents of a security header (not shown) of the tunnel encapsulated, encrypted packet 140 and ii) a particular key to use for encrypting the encrypted content 144, according to an embodiment.

In an embodiment, the classification engine 164 includes a database of associations between header fields values of packets and classifications. In an embodiment, the classification engine 164 includes a database of associations between header fields values of packets and virtual network interfaces. In an embodiment, the classification engine 164 performs lookups in the database using header fields in the frame 132. In an embodiment, the database of associations includes a ternary content addressable memory (TCAM), and the classification engine 164 performs lookups in the TCAM using header fields in the frame 132.

In an embodiment, the packet processor 160 generates packet descriptors for packets received by the network device, each packet descriptor configured to store metadata regarding the packet, such a location in a packet buffer (not shown) at which the packet is stored, a target network interface(s) via which the packet is to be transmitted from the network device 104, processing actions to be taken with respect to the packet, etc. Packet descriptors are passed between processing elements of the network device 104, including among elements of the packet processor 160.

In an embodiment, the classification engine 164 is configured to store an indication of the determined classification of the packet in the corresponding packet descriptor. In an embodiment, the classification engine 164 is configured to store an indication of the determined virtual network interface for the packet in the corresponding packet descriptor.

A network security protocol engine 166 is configured to, for packets that are to be formatted according to the network security protocol (e.g., MACsec or another suitable network security protocol) generate contents to be included in a security header for each packet, contents of the security header being defined by the network security protocol. In some embodiments, the network security protocol engine 166 is also configured to add security header to the packet, the security header having a format defined by the network security protocol.

In an embodiment, the network security protocol engine 166 uses the classification of the packet by the classification engine 164 to determine whether a packet is to be formatted according to the network security protocol. In an embodiment in which the classification engine 164 assigns a virtual network interface, the network security protocol engine 166 uses the virtual network interface to determine contents of the security header to be added to the packet.

In an embodiment, the network security protocol engine 166 includes a database that indicates associations between classifications and one or more of i) locations at which security headers are to be inserted, ii) contents of security headers, etc. In an embodiment, the network security protocol engine 166 includes a database that indicates associations between virtual network interfaces and one or more of i) locations at which security headers are to be inserted, ii) contents of security headers, etc. In some embodiments, the network security protocol engine 166 uses a classification and/or virtual network interface assigned by the classification engine 164 to the frame 132 to determine one or more of i) a location at which a security header is to be inserted, ii) contents of the security header, etc. In some embodiments, the network security protocol engine 166 retrieves an indication of the classification and/or an indication of an assigned virtual network interface from the packet descriptor corresponding to the packet.

In some embodiments, the network security protocol engine 166 retrieves an indication of the classification and/or an indication of an assigned virtual network interface from the packet descriptor corresponding to the packet.

A header modification engine 168 is configured to modify headers of packets received by the network device 104 prior to transmission of the packets from the network device 104. For example, the header modification engine 168 is configured to add tunneling headers, remove tunneling headers, modify destination and/source network addresses, etc. When the classification of a packet by the classification engine 164 indicates that i) data in the packet are to be formatted according to a network security protocol, and ii) a tunneling header is to be added to the packet, the header modification engine 168 is configured to i) add a security header to the packet, the security header having a format defined by the network security protocol, and ii) add the tunneling header to the packet, according to other embodiments. In other embodiments in which the network security protocol engine 166 adds security headers to packets, the header modification engine 168 is configured to add the tunneling header to the packet.

In an embodiment, the header modification engine 168 is configured to add any of multiple different types of tunneling headers to a packet. In an embodiment, the multiple different types of tunneling headers include two or more of: Generic Routing Encapsulation (GRE) tunneling headers, Layer 2 Multiprotocol Label Switching (MPLS) tunneling headers, Layer 3 MPLS tunneling headers, VxLAN tunneling headers, proprietary tunneling headers, etc. In some embodiments, the header modification engine 168 is configured to add any of multiple different types of tunneling headers to a packet that is to be formatted according to a network security protocol. As an illustrative example, the header modification engine 168 is configured to add any of multiple different types of tunneling headers to a packet that is to be formatted according to MACsec, according to some embodiments.

In an embodiment, the header modification engine 168 includes a database that indicates associations between classifications and one or more of i) types of tunneling headers to be added, ii) contents of tunneling headers, iii) locations at which security headers are to be inserted, iv) contents of security headers, etc. In an embodiment, the header modification engine 168 includes a database that indicates associations between virtual network interfaces and one or more of i) types of tunneling headers to be added, ii) contents of tunneling headers, iii) locations at which security headers are to be inserted, etc. In some embodiments, the header modification engine 168 uses a classification and/or virtual network interface assigned by the classification engine 164 to the frame 132 to determine one or more of i) a type of tunneling header to be added, ii) contents of the tunneling header, iii) a location at which a security header is to be inserted, iv) contents of the security header, etc.

When a tunneling header is to be added to a packet, the classification of the packet by the classification engine 164 indicates the tunneling header that is to be added, according to an embodiment. In an embodiment in which the classification engine 164 assigns a virtual network interface, the header modification engine 168 uses the virtual network interface to determine contents of the tunneling header 148 to be added.

In some embodiments, the header modification engine 168 is configured to add to a packet that is to be formatted according to the network security protocol a tunneling header having a format that is independent of the network security protocol.

In some embodiments, the header modification engine 168 retrieves an indication of the classification and/or an indication of an assigned virtual network interface from the packet descriptor corresponding to the packet.

The network device 104 also includes an encryption/decryption engine 172 that is configured to encrypt content of packets that are to be formatted according to the network security protocol. For example, the encryption/decryption engine 172 encrypts data from the frame 132 to generate the encrypted contents 144 of the tunnel encapsulated, encrypted packet 140. The encryption/decryption engine 172 is also configured to decrypt encrypted content in a received packet that is formatted according to the network security protocol.

When a portion of a packet is to be encrypted, the classification of the packet by the classification engine 164 indicates the portion of the packet that is to be encrypted, according to an embodiment. In an embodiment in which the classification engine 164 assigns a virtual network interface, the encryption/decryption engine 172 uses the virtual network interface to determine the portion of the packet that is to be encrypted and a key to use for the encryption.

In an embodiment, the encryption/decryption engine 172 includes a database that indicates associations between classifications and one or more of i) locations of portions of packets that are to be encrypted or decrypted, ii) keys to be used for encryption or decryption, etc. In an embodiment, the encryption/decryption engine 172 includes a database that indicates associations between virtual network interfaces and one or more of i) locations of portions of packets that are to be encrypted or decrypted, ii) a key to be used for encryption or decryption, etc. In some embodiments, the encryption/decryption engine 172 uses a classification and/or virtual network interface assigned by the classification engine 164 to the frame 132 to determine one or more of i) a location(s) of a portion(s) of the packet that is to be encrypted or decrypted, ii) a key to be used for encryption or decryption, etc.

In some embodiments, the encryption/decryption engine 172 retrieves an indication of the classification and/or an indication of an assigned virtual network interface from the packet descriptor corresponding to the packet.

The network device 104 further includes a transmit processor 176 that is configured to forward packets that have been processed by the network device 104 to network interfaces for transmission. For example, after the header modification engine 168 adds the tunneling header 148 and after the encryption/decryption engine 172 generates the encrypted content 144, the transmit processor 176 forwards the tunnel encapsulated, encrypted packet 140 to the network interface 120 for transmission from the network device 104.

The network device 108 includes a packet processor 178 having several processing engines described below.

For example, the packet processor 178 includes a classification engine 180 that is configured to process header information in packets received by the network device 104 to classify the packets. In an embodiment, classification of a packet by the classification engine 180 indicates that i) the packet is to be tunnel-terminated at the network device 108, which includes removing a tunneling header from the packet, and ii) encrypted data in the packet is to be decrypted. For example, the classification engine 180 is configured to process header information in the tunneling header 148 of the tunnel encapsulated, encrypted packet 140 to determine that i) the tunnel encapsulated, encrypted packet 140 is to be tunnel-terminated at the network device 108, which includes removing the tunneling header 148, and ii) the encrypted content 144 is to be decrypted.

In an embodiment, classification of a packet by the classification engine 180 includes assigning a virtual network interface to the packet, the virtual network interface corresponding to a particular tunnel and a particular network security protocol association.

In some embodiments, the assigned virtual network interface indicates i) the tunnel encapsulated, encrypted packet 140 is to be tunnel-terminated at the network device 108, and ii) a corresponding particular network security protocol association. The particular network security protocol association corresponds to a particular key to use for decrypting the encrypted content 144, according to an embodiment.

In an embodiment, the classification engine 180 includes a database of associations between header fields values of packets and classifications. In an embodiment, the classification engine 180 includes a database of associations between header fields values of packets and virtual network interfaces. In an embodiment, the classification engine 180 performs lookups in the database using header fields in the packet 140. In an embodiment, the database of associations includes a TCAM, and the classification engine 180 performs lookups in the TCAM using header fields in the packet 200 (e.g., including fields in the tunneling header 148).

In an embodiment, the classification engine 180 includes a database of associations between header fields values of packets and classifications. In an embodiment, the classification engine 180 includes a database of associations between header fields values of packets and virtual network interfaces. In an embodiment, the classification engine 180 performs lookups in the database using header fields in the packet 200, including fields in the tunneling header 148. In an embodiment, the database of associations includes a TCAM, and the classification engine 180 performs lookups in the TCAM using header fields in the packet 200, including fields in the tunneling header 148.

In an embodiment, the packet processor 178 generates packet descriptors for packets received by the network device, each packet descriptor configured to store metadata regarding the packet, such a location in a packet buffer (not shown) at which the packet is stored, a target network interface(s) via which the packet is to be transmitted from the network device 108, processing actions to be taken with respect to the packet, etc. Packet descriptors are passed between processing elements of the network device 108, including among elements of the packet processor 178.

In an embodiment, the classification engine 180 is configured to store an indication of the determined classification of the packet in the corresponding packet descriptor. In an embodiment, the classification engine 180 is configured to store an indication of the determined virtual network interface for the packet in the corresponding packet descriptor.

A network security protocol engine 182 is configured to, for packets that are formatted according to the network security protocol (e.g., MACsec or another suitable network security protocol) analyze contents of a security header in each packet according to the network security protocol. For example, in some embodiments, the network security protocol engine 182 is configured to authenticate network addresses in a header of the packet, mark packets for dropping if authentication fails, etc. In some embodiments, the network security protocol engine 182 is also configured to remove a security header from the packet.

In an embodiment, the network security protocol engine 182 uses the classification of the packet by the classification engine 180 to determine whether a packet is formatted according to the network security protocol.

In an embodiment, the network security protocol engine 182 includes a database that indicates associations between classifications and one or more of i) whether a packet is formatted according to the network security protocol, ii) locations of security headers that are to be removed, etc. In an embodiment, the network security protocol engine 182 includes a database that indicates associations between virtual network interfaces and one or more of i) whether a packet is formatted according to the network security protocol, ii) locations of security headers that are to be removed, etc. In some embodiments, the network security protocol engine 182 uses a classification and/or virtual network interface assigned by the classification engine 180 to the packet 200 to determine one or more of i) whether a packet is formatted according to the network security protocol, ii) locations of security headers that are to be removed, etc.

In some embodiments, the network security protocol engine 182 retrieves an indication of the classification and/or an indication of an assigned virtual network interface from the packet descriptor corresponding to the packet.

A header modification engine 184 is configured to modify headers of packets received by the network device 108 prior to transmission of the packets from the network device 108. For example, the header modification engine 184 is configured to add tunneling headers, remove tunneling headers, modify destination and/or source network addresses, etc. When the classification of a packet by the classification engine 180 indicates that the packet is a tunnel encapsulated, encrypted packet that is to be tunnel-terminated at the network device 108, the header modification engine 168 is configured to i) remove a security header from the packet, and ii) remove the tunneling header to the packet.

In an embodiment, the header modification engine 184 is configured to remove any of multiple different types of tunneling headers from a packet. In an embodiment, the multiple different types of tunneling headers include two or more of: Layer 2 MPLS tunneling headers, Layer 3 MPLS tunneling headers, IPv6 tunneling over hierarchical MPLS network (with or without VLAN tags) headers, SRv6 over hierarchical MPLS network headers, Ethernet over SRv6 tunneling using UDP for multiplexing headers, GRE tunneling headers, VxLAN tunneling headers, proprietary tunneling headers, etc. In some embodiments, the header modification engine 184 is configured to remove any of multiple different types of tunneling headers from an encapsulated packet that is formatted according to a network security protocol. As an illustrative example, the header modification engine 184 is configured to remove any of multiple different types of tunneling headers from an encapsulated packet that is to be formatted according to MACsec, according to some embodiments.

In an embodiment, the header modification engine 184 includes a database that indicates associations between classifications and one or more of i) whether packets include tunneling headers, ii) locations of tunneling headers are to be removed, etc. In an embodiment, the header modification engine 184 includes a database that indicates associations between virtual network interfaces and one or more of i) whether packets include tunneling headers, ii) locations of tunneling headers are to be removed, etc. In some embodiments, the header modification engine 184 uses a classification and/or virtual network interface assigned by the classification engine 180 to the packet 200 to determine one or more of i) that the tunneling header 148 is to be removed, and ii) a location of the tunneling header 148, etc.

When a tunneling header and/or a security header is to be removed from a packet, the classification of the packet by the classification engine 180 indicates the tunneling header and/or security header that are to be removed, according to an embodiment.

In some embodiments, the header modification engine 184 is configured to remove from an encapsulated packet that is formatted according to the network security protocol a tunneling header having a format that is independent of the network security protocol.

In some embodiments, the header modification engine 184 retrieves an indication of the classification and/or an indication of an assigned virtual network interface from the packet descriptor corresponding to the packet.

The network device 108 also includes an encryption/decryption engine 188 that is configured to encrypt content of packets that are to be formatted according to the network security protocol. The encryption/decryption engine 188 is also configured to decrypt encrypted content in a received packet that is formatted according to the network security protocol. For example, the encryption/decryption engine 188 decrypts encrypted content 144 from the tunnel encapsulated, encrypted packet 140.

When a portion of a packet is to be decrypted, the classification of the packet by the classification engine 180 indicates the portion of the packet that is to be decrypted, according to an embodiment. In an embodiment in which the classification engine 180 assigns a virtual network interface, the encryption/decryption engine 188 uses the virtual network interface to determine the portion of the packet that is to be decrypted and a key to use for the decryption.

In an embodiment, the encryption/decryption engine 188 includes a database that indicates associations between classifications and one or more of i) locations of portions of packets that are to be encrypted or decrypted, ii) keys to be used for encryption or decryption, etc. In an embodiment, the encryption/decryption engine 188 includes a database that indicates associations between virtual network interfaces and one or more of i) locations of portions of packets that are to be encrypted or decrypted, ii) a key to be used for encryption or decryption, etc. In some embodiments, the encryption/decryption engine 188 uses a classification and/or virtual network interface assigned by the classification engine 180 to the packet 200 to determine one or more of i) a location(s) of a portion(s) of the packet that is to be encrypted or decrypted, ii) a key to be used for encryption or decryption, etc.

In some embodiments, the encryption/decryption engine 188 retrieves an indication of the classification and/or an indication of an assigned virtual network interface from the packet descriptor corresponding to the packet.

The network device 108 further includes a transmit processor 192 that is configured to forward packets that have been processed by the network device 108 to network interfaces for transmission. For example, after the header modification engine 184 removes the tunneling header 148 and after the encryption/decryption engine 188 decrypts the encrypted content 144 as part of recovering the frame 132, the transmit processor 176 forwards the frame 132 to the network interface 124 for transmission from the network device 108.

In some embodiments, the network device 108 is configured to re-encapsulate the frame 132 in a tunneling header prior to transmitting the frame 132 via the network interface 124. In some embodiments, the network device 108 additionally or alternatively is re-encrypt contents of the frame 132 and reformat the frame according to a network security protocol prior to transmitting the frame 132 via the network interface 124.

In some embodiments, the network device 104 is also configured to perform acts that the network device 108 is configured to perform, and vice versa. For example, the classification engine 164 is configured to perform acts that the classification engine 180 is configured to perform, and vice versa. As another example, the network security protocol engine 166 is configured to perform acts that the network security protocol engine 182 is configured to perform, and vice versa. As another example, the header modification engine 168 is configured to perform acts that the header modification engine 184 is configured to perform, and vice versa. As another example, the encryption/decryption engine 172 is configured to perform acts that the encryption/decryption engine 188 is configured to perform, and vice versa. As another example, the transmit processor 176 is configured to perform acts that the transmit processor 192 is configured to perform, and vice versa.

Each one or more of: the classification engine 164, the classification engine 180, the network security protocol engine 166, the network security protocol engine 182, the header modification engine 168, the header modification engine 184, the encryption/decryption engine 172, the encryption/decryption engine 188, the transmit processor 176, and the transmit processor 192, is implemented using hardware circuitry, according to various embodiments. Each one or more of: the classification engine 164, the classification engine 180, the header modification engine 168, the header modification engine 184, the encryption/decryption engine 172, the encryption/decryption engine 188, the transmit processor 176, and the transmit processor 192, is additionally or alternatively implemented using one or more processors that execute machine-readable instructions stored in one or more memories, according to other various embodiments.

Figure 2:
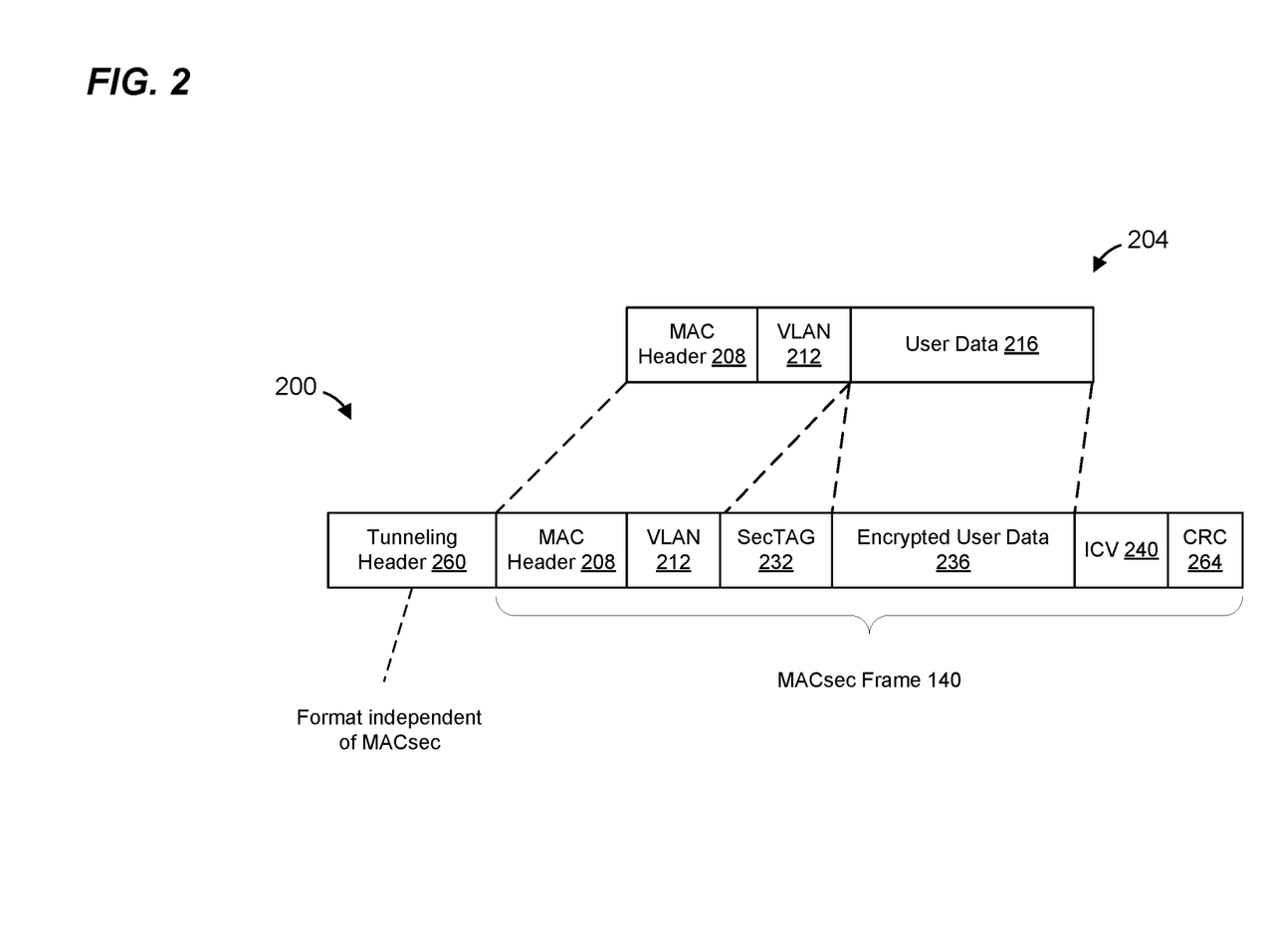
FIG. 2 is a simplified block diagram of an example MACsec frame with a tunneling header that is independent of the MACsec protocol, according to an embodiment.

FIG. 2 is a diagram of an example tunnel encapsulated, encrypted packet 200 that the network device 104 of FIG. 1 is configured to generate and transmit, and that the network device 108 of FIG. 1 is configured to receive and process, according to an embodiment. The tunnel encapsulated, encrypted packet 200 is described with reference to an Ethernet frame 204. In an embodiment, the Ethernet frame 204 corresponds to the frame 132 of FIG. 1, and the tunnel encapsulated, encrypted packet 200 corresponds to the tunnel encapsulated, encrypted packet 140 of FIG. 1. In other embodiments, the tunnel encapsulated, encrypted packet 140 of FIG. 1 includes data formatted according to a suitable network security protocol different than MACsec.

The Ethernet frame 204 includes a media access control (MAC) header 208, a virtual local area network (VLAN) field 212, and a user data portion 216. To generate the encapsulated, encrypted packet 200, the network device 104 (e.g., the network security protocol engine 166 and/or the header modification engine 168) generates a security header (SecTAG) 232 and inserts the SecTAG 232 between the VLAN field 212 and the user data portion 216. In some embodiments, contents of the SecTAG 232 correspond to a categorization of the Ethernet frame 204 by the classification engine 164. In some embodiments, contents of the SecTAG 232 correspond to a virtual network interface assigned to the Ethernet frame 204 by the classification engine 164.

The network device 104 (e.g., the encryption/decryption engine 172) encrypts the user data 216 to generate encrypted user data 236. In some embodiments, a particular key for encrypting the user data 216 and/or a location of the user data 216 within the packet 200 corresponds to a categorization of the Ethernet frame 204 by the classification engine 164. In some embodiments, the particular key and/or a location of the user data 216 within the packet 200 correspond to a virtual network interface assigned to the Ethernet frame 204 by the classification engine 164.

The network device 104 (e.g., the encryption/decryption engine 172) generates, using a key that is also used to generate the encrypted user data 236, an integrity check value (ICV) 240 based on the MAC header 208, the SecTAG 232, and the encrypted user data 236. In some embodiments, a particular key for generating the ICV 240 and/or locations of the fields of the packet to be used for generating the ICV 240 correspond to a categorization of the Ethernet frame 204 by the classification engine 164. In some embodiments, the particular key and/or locations of the fields of the packet to be used for generating the ICV 240 correspond to a virtual network interface assigned to the Ethernet frame 204 by the classification engine 164. In some embodiments, the key used for generating the ICV 240 is the same key used for encrypting the user data 216.

The network device 104 (e.g., the header modification engine 168) adds a tunneling header 260. In some embodiments, contents of the tunneling header 260 correspond to a categorization of the Ethernet frame 204 by the classification engine 164. In some embodiments, contents of the tunneling header 260 correspond to a virtual network interface assigned to the Ethernet frame 204 by the classification engine 164.

In some embodiments, the tunneling header 260 has a format that is independent of MACsec.

Additionally, the network device 104 adds a cyclic redundancy check (CRC) field 264.

Because the tunneling header 260 and optionally other fields, such as the VLAN field 212, of the packet 200 are not authenticated by the ICV 240, such fields can be modified by intermediate network devices in the communication network 112 without causing the network device 108 to detect an authorized change in any authenticated fields of the packet 200. As an illustrative example, a next hop field in the tunneling header 260 can be modified by intermediate network devices in the communication network 112.

In an embodiment, encryption of the user data 216 and generation of the ICV 240 is performed at an end of processing of the packet 200 by the network device 104 prior to transmitting the packet 200. When a transmit timestamp is to be added by the network device 104 to the packet 200, the transmit timestamp indicating a time at which the packet 200 is transmitted by the network device 104, such a timestamp must be added prior to encryption of the user data 216 and generation of the ICV 240. Thus, performing encryption of the user data 216 and generation of the ICV 240 at an end of processing of the packet 200 by the network device 104 prior to transmitting the packet 200, increases the accuracy of the transmit timestamp, at least in some embodiments. Additionally, performing encryption of the user data 216 and generation of the ICV 240 at an end of processing of the packet 200 by the network device 104 permits increased flexibility regarding the modification of header fields of the packet 200 by the network device 104, because header fields protected by the ICV 240 and/or within the user data 216 cannot be modified after encryption and/or generation of the ICV 240, according to some embodiments.

Upon receipt of the tunnel encapsulated, encrypted packet 200, the network device 108 (e.g., the classification engine 180) uses at least the tunneling header 260 to classify the tunnel encapsulated, encrypted packet 200 as a packet that is to be tunnel-terminated at the network device 108 and that includes a MACsec packet. In an embodiment, the classification engine 180) uses at least the tunneling header 260 to assign the tunnel encapsulated, encrypted packet 200 to a virtual network interface that corresponds to a particular tunnel that terminates at the network device 108 and that includes MACsec packets.

The network device 108 (e.g., the encryption/decryption engine 188) generates, using a key, an ICV based on the MAC header 208, the SecTAG 232, and the encrypted user data 236. In some embodiments, a particular key for generating the ICV and/or locations of the fields of the packet to be used for generating the ICV correspond to a categorization of the tunnel encapsulated, encrypted packet 200 by the classification engine 180. In some embodiments, the particular key and/or locations of the fields of the packet to be used for generating the ICV corresponds to a virtual network interface assigned to the tunnel encapsulated, encrypted packet 200 by the classification engine 180.

The network device 108 (e.g., the encryption/decryption engine 188) decrypts the encrypted user data 236 to regenerate the user data 216. In some embodiments, a particular key for encrypting the user data 216 and/or a location of the encrypted user data 236 within the packet to be used for generating the ICV 240 correspond to a categorization of the packet 200 by the classification engine 180. In some embodiments, the particular key and/or a location of the encrypted user data 236 within the packet correspond to a virtual network interface assigned to the packet 200 by the classification engine 180. In some embodiments, the key used for decrypting the encrypted user data 236 is the same key used for generating the ICV.

The network device 108 (e.g., the network security protocol engine 182 compares the ICV generated by the encryption/decryption engine 188 to the ICV 240. If the ICV generated by the encryption/decryption engine 188 does not match the ICV 240, the network device 108 drops the tunnel encapsulated, encrypted packet 200, for example.

The network device 108 (e.g., the header modification engine 184 and/or the network security protocol engine 182) removes the tunneling header 260, the SecTAG 232, and the ICV 240, according to an embodiment. In some embodiments, locations of the tunneling header 260 and/or the SecTAG 232 correspond to a categorization of the packet 200 by the classification engine 180. In some embodiments, locations of the tunneling header 260 and/or the SecTAG 232 correspond to a virtual network interface assigned to the packet 200 by the classification engine 180.

In some embodiments, the packet 204 does not include the VLAN field 212, and thus the VLAN field 212 is omitted from the packet 204. In some embodiments, the packet 204 additionally or alternatively includes one or more other fields between the MAC header 208 and the user data 216 that correspond to one or more tunneling protocols.

Figure 3:
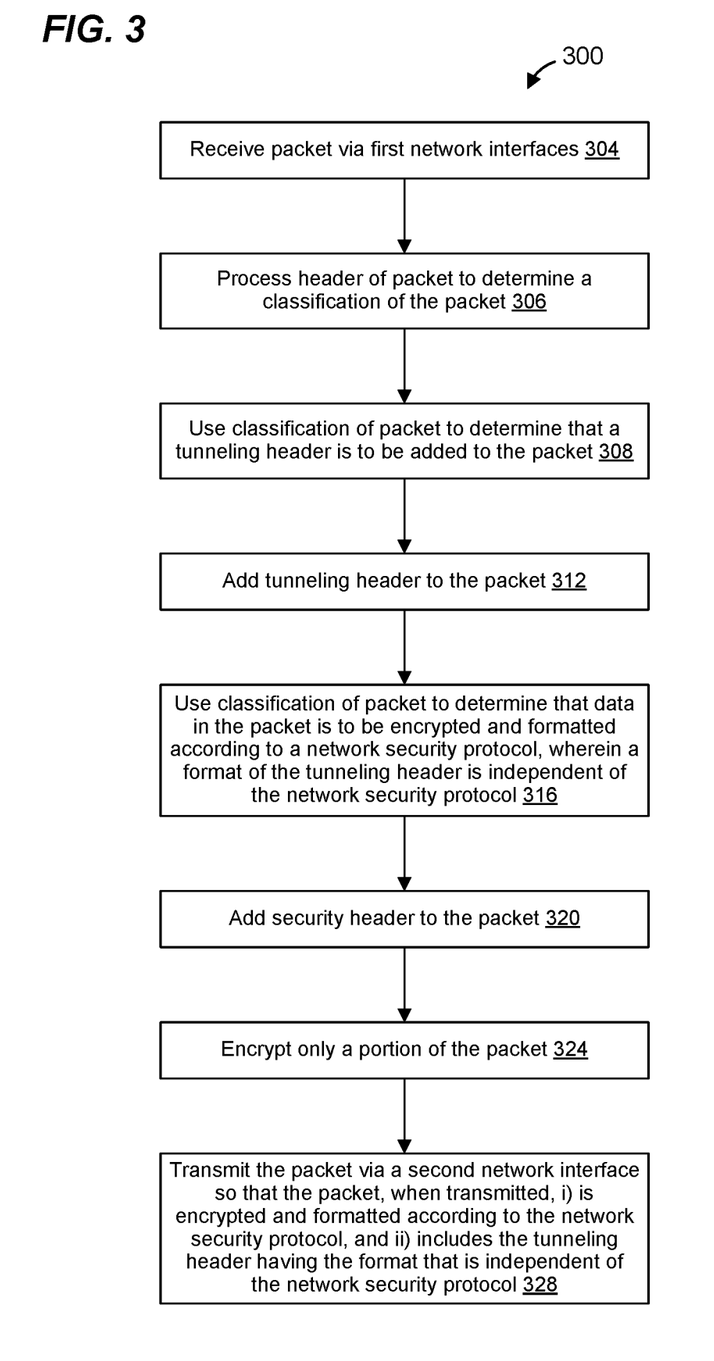
FIG. 3 is a flow diagram of an example method for securely transmitting packets, according to an embodiment.

FIG. 3 is a flow diagram of an example method 300 for securely transmitting packets, according to an embodiment. The method 300 is implemented in the example network device 104 of FIG. 1, according to an embodiment, and the method 300 is described with reference to FIG. 1 for ease of explanation. The method 300 includes generating a packet having a format similar to the packet 200 of FIG. 2, according to an embodiment, and the method 300 is described with reference to FIG. 2 for ease of explanation. In other embodiments, the method 300 is implemented in a suitable network device different than the example network device 104 and/or involves generating a packet having a suitable format different than the format of the packet 200.

At block 304, a network device receives a packet via a first network interface of the network device. For example, the network device 104 receives the frame 132 via the network interface 116. In an embodiment, the packet has a format the same as the packet 204 of FIG. 2. In other embodiments, the packet has a suitable format different than the packet 204 of FIG. 2.

In some embodiments, the packet received at block 304 is encapsulated by a tunneling header, and the method 300 further comprises removing the tunneling header. In some embodiments, the packet received at block 304 additionally or alternatively is formatted according to a network security protocol (e.g., MACsec or another suitable network security protocol), and the method 300 further comprises decrypting contents in the packet and removing a security header formatted according to the network security protocol.

At block 306, the network device processes a header of the packet to determine a classification of the packet. In an embodiment, processing the header of the packet at block 306 includes the classification engine 164 processing the header of the packet to classify the packet. In an embodiment, classifying the packet includes assigning a virtual network interface to the packet. In some embodiments, the classification engine 164 classifies the packet additionally using other suitable information corresponding to the packet, such as an indication that the packet was received via the first network interface.

At block 308, the network device uses the classification determined at block 306 to determine that a tunneling header is to be added to the packet. In some embodiments, a classification of the packet and/or an assigned virtual network interface indicates that a particular type of tunneling header is to be added to the packet, the particular type of tunneling header from among multiple different types of tunneling headers that the network device is configured to add to packets.

In some embodiments, determining that a tunneling header is to be added to the packet additionally includes the header modification engine 164 using the classification of the packet and/or an assigned virtual network interface to determine that a tunneling header is to be added to the packet. In some embodiments, the header modification engine 164 uses the classification of the packet and/or the assigned virtual network interface to determine the particular type of tunneling header to be added to the packet and contents of the tunneling header.

At block 312, the network device adds the tunneling header to the packet. For example, the header modification engine 164 adds the tunneling header to the packet.

At block 316, the network device uses the classification of the packet determined at block 306 to determine that data in the packet is to be encrypted and formatted according to the network security protocol.

In some embodiments, a classification of the packet and/or an assigned virtual network interface indicates that the data in the packet is to be encrypted and formatted according to the network security protocol.

In some embodiments, determining that data in the packet is to be encrypted and formatted according to the network security protocol additionally includes the network security protocol engine 166 using the classification of the packet and/or the assigned virtual network interface to determine that data in the packet is to be encrypted and formatted according to the network security protocol.

In an embodiment, a format of the tunneling header added at block 312 is independent of the network security protocol.

At block 320, the network device adds a security header to the packet. For example, the network security protocol engine 166 adds the security header to the packet.

At block 324, the network device encrypts only a portion of the packet that is less than the entire packet. For example, the encryption/decryption engine 172 encrypts only a portion of the packet that is less than the entire packet. In some embodiments, the classification of the packet indicates the portion of the packet that is to be encrypted.

At block 328, the network device transmits the packet from a second network interface of the network device so that the packet, when transmitted, i) is encrypted and formatted according to the network security protocol, and ii) includes the tunneling header having the format that is independent of the network security protocol.

In various embodiments, one or more of the blocks of the method 300 are omitted, additional blocks are added, the ordering of blocks is changed, etc. For example, adding the tunneling header to the packet (block 312) occurs after the security header is added (block 320) and/or after the portion of the packet is encrypted (block 324), according to an embodiment. Similarly, determining that data in the packet is to be encrypted and formatted according to the network security protocol (block 316) occurs before determining that the tunneling header is to be added to the packet (block 308), according to an embodiment.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as a RAM, a ROM, a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A network device, comprising:
 a plurality of network interfaces configured to couple to a plurality of network links;
 a hardware packet processor having:
  a classification engine implemented using at least one of hardware circuitry and one or more processors that execute machine readable instructions, the classification engine configured to process a header of a packet received via a first network interface among the plurality of network interfaces to determine a classification of the packet that indicates i) data in the packet is to be encrypted and formatted according to a network security protocol, and ii) a tunneling header is to be added to the packet, the tunneling header having a format that is independent of the network security protocol,
  a header modification engine implemented using at least one of hardware circuitry and one or more processors that execute machine readable instructions, the header modification engine configured to add the tunneling header to the packet in response to the classification of the packet,
  a network security protocol engine implemented using at least one of hardware circuitry and one or more processors that executes machine readable instructions, the network security protocol engine configured to add to the packet a security header distinct from the tunneling header in response to the classification of the packet, and
  an encryption engine implemented using at least one of the hardware circuitry and one or more processors that executes machine readable instructions, the encryption engine configured to encrypt only a portion of the packet that is less than the entire packet in response to the classification of the packet; and
 a transmit processor configured to forward the packet to a second network interface among the plurality of network interfaces so that the second network interface transmits the packet i) that is encrypted and formatted according to the network security protocol, and ii) that includes the tunneling header having the format that is independent of the network security protocol, via a particular network link communicatively coupled to the second network interface.

2. The network device of claim 1, wherein:
 the classification engine is configured to process the header of the packet received via the first network interface to assign a virtual network interface to the packet, the virtual network interface indicating that i) data in the packet is to be encrypted and formatted according to the network security protocol, and ii) the tunneling header is to be added to the packet;

the header modification engine configured to use the virtual network interface assigned to the packet to determine that the tunneling header is to be added to the packet; and the network security protocol engine is configured to use the virtual network interface assigned to the packet to determine that the packet is to be formatted according to the network security protocol.

3. The network device of claim 2, wherein:

the classification engine is configured to add an indication of the virtual network interface to a packet descriptor corresponding to the packet;

the header modification engine configured to retrieve the virtual network interface assigned to the packet from the packet descriptor; and the network security protocol engine is configured to retrieve the virtual network interface assigned to the packet from the packet descriptor.

4. The network device of claim 2, wherein:

the header modification engine configured to use the virtual network interface to select a type of tunneling header that is to be added to the packet, the type of tunneling header being selected from multiple different types of tunneling headers that the header modification engine is configured to add to packets.

5. The network device of claim 2, wherein:

the header modification engine is configured to use the indication of the virtual network interface to determine contents of the tunneling header to be added to the packet; and the network security protocol engine is configured to use the indication of the virtual network interface to determine contents of the security header.

6. The network device of claim 2, wherein:

the encryption engine is configured to use the indication of the virtual network interface to identify the portion of the packet that is to be encrypted.

7. The network device of claim 6, wherein:

the encryption engine includes a security information database that indicates, for respective virtual network interfaces, i) respective starting locations of portions of packets that are to be encrypted, and ii) respective lengths of portions of packets that are to be encrypted; and the encryption engine is configured to i) use the indication of the virtual network interface in the packet descriptor to retrieve from the security information database a particular starting location and a particular length, and ii) use the particular starting location and the particular length to identify the portion of the packet hat is to be encrypted.

8. The network device of claim 2, wherein:

the encryption engine includes a security information database that indicates respective encryption keys for respective virtual network interfaces; and the encryption engine is configured to use the indication of the virtual network interface in the packet descriptor to retrieve from the security information database a particular encryption key that is to be used for encrypting the portion of the packet.

9. The network device of claim 1, wherein the encryption engine is configured to encrypt only a portion of the packet that excludes the tunneling header.

10. The network device of claim 1, wherein:

the network security protocol engine is configured to add to the packet a security header that conforms to the IEEE 802.1AE Standard; and the encryption engine is configured to encrypt only the portion of the packet according to the IEEE 802.1AE Standard.

11. The network device of claim 1, wherein:

the network security protocol engine is configured to add to the packet a security header that conforms to the Internet Protocol Security (IPsec) protocol; and the encryption engine configured to encrypt only the portion of the packet according to the IPsec protocol.

12. A method for securely transmitting packets, comprising:

receiving, at a network device, a packet via a first network interface of the network device;

processing, at the network device, a header of the packet to determine a classification of the packet;

using, at the network device, the classification of the packet to determine that a tunneling header is to be added to the packet;

adding, at the network device, the tunneling header to the packet;

using, at the network device, the classification of the packet to determine that data in the packet is to be encrypted and formatted according to a network security protocol, wherein a format of the tunneling header is independent of the network security protocol;

adding to the packet, at the network device, a security header distinct from the tunneling header, the security header having a format defined by the network security protocol;

encrypting, at the network device, only a portion of the packet that is less than the entire packet; and transmitting the packet from a second network interface of the network device so that the packet, when transmitted, i) is encrypted and formatted according to the network security protocol, and ii) includes the tunneling header having the format that is independent of the network security protocol.

13. The method of securely transmitting packets of claim 12, wherein:

processing the header of the packet to determine the classification of the packet comprises assigning a virtual network interface to the packet, the virtual network interface indicating that i) data in the packet is to be encrypted and formatted according to the network security protocol, and ii) the tunneling header is to be added to the packet;

using the classification of the packet to determine that the tunneling header is to be added to the packet comprises using the virtual network interface assigned to the packet to determine that the tunneling header is to be added to the packet; and using the classification of the packet to determine that the packet is to be formatted according to the network security protocol comprises using the virtual network interface assigned to the packet to determine that the packet is to be formatted according to the network security protocol.

14. The method of securely transmitting packets of claim 13, further comprising:

adding, at the network device, an indication of the virtual network interface to a packet descriptor corresponding to the packet;

using the virtual network interface in the packet descriptor to determine that the tunneling header is to be added to the packet; and using the virtual network interface in the packet descriptor to determine that the packet is to be formatted according to the network security protocol.

15. The method of securely transmitting packets of claim 13, further comprising:
using, at the network device, the virtual network interface to select a type of tunneling header that is to be added to the packet, the type of tunneling header being selected from multiple different types of tunneling headers that the header modification engine is configured to add to packets.

16. The method of securely transmitting packets of claim 13, further comprising:
using, at the network device, the indication of the virtual network interface to determine contents of the tunneling header to be added to the packet; and
using, at the network device, the indication of the virtual network interface to determine contents of the security header.

17. The method of securely transmitting packets of claim 13, further comprising:
using, at the network device, the indication of the virtual network interface to identify the portion of the packet that is to be encrypted.

18. The method of securely transmitting packets of claim 17, wherein using the indication of the virtual network interface to identify the portion of the packet that is to be encrypted comprises:
using, at the network device, the indication of the virtual network interface to retrieve from a security information database a particular starting location and a particular length, the security information database indicating, for respective virtual network interfaces, i) respective starting locations of portions of packets that are to be encrypted, and ii) respective lengths of portions of packets that are to be encrypted; and
using, at the network device, the particular starting location and the particular length to identify the portion of the packet that is to be encrypted.

19. The method of securely transmitting packets of claim 13, further comprising:
using, at the network device, the indication of the virtual network interface in the packet descriptor to retrieve from a security information database a particular encryption key that is to be used for encrypting the portion of the packet, the security information database storing respective encryption keys for respective virtual network interfaces.

20. The method of securely transmitting packets of claim 12, wherein encrypting only the portion of the packet comprises encrypting only a portion of the packet that excludes the tunneling header.

21. The method of securely transmitting packets of claim 12, wherein:
adding to the packet a security header comprises adding a security header that conforms to the IEEE 802.1AE Standard; and
encrypting only the portion of the packet comprises encrypting only the portion of the packet according to the IEEE 802.1AE Standard.

22. The method of securely transmitting packets of claim 12, wherein:
adding to the packet a security header comprises adding to the packet a security header that conforms to the Internet Protocol Security (IPsec) protocol; and
encrypting only the portion of the packet comprises encrypting only the portion of the packet according to the IPsec protocol.

* * * * *